United States Patent [19]

Musschoot

[11] 3,776,352

[45] Dec. 4, 1973

[54] SEALED DRIVE FOR VIBRATORY MATERIAL HANDLING DEVICE

[75] Inventor: Albert Musschoot, Barrington, Ill.

[73] Assignee: General Kinematics Corporation, Barrington, Ill.

[22] Filed: July 8, 1971

[21] Appl. No.: 160,681

[52] U.S. Cl. .................... 198/220 DB, 198/220 CA
[51] Int. Cl. ............................................. B65g 27/00
[58] Field of Search ................ 198/220 CA, 220 DB

[56] References Cited
UNITED STATES PATENTS

| | | | |
|---|---|---|---|
| 3,203,264 | 8/1965 | Evans | 198/220 CA |
| 3,236,381 | 2/1966 | Poynter | 198/220 CA |
| 3,178,068 | 4/1965 | Dumbaugh | 198/220 A |
| 3,068,996 | 12/1962 | Musschoot | 198/220 CC |
| 3,468,418 | 9/1969 | Renner | 198/220 A |

Primary Examiner—Richard E. Aegerter
Attorney—Axel A. Hofgren et al.

[57] ABSTRACT

A vibratory material handler including a material handling surface, a mechanism for vibrating the same and a housing sealing the vibrating mechanism from particulate material in the surrounding environment. The housing includes an apertured wall through which the motor shaft may extend and which is held in substantial abutment with the motor casing. The remainder of the housing holds a weighted member eccentrically mounted on the shaft and shields the same from particulate material while the substantial abutment of the wall at the motor casing effects a substantial seal between the two to preclude entry of particulate material into the motor itself.

1 Claim, 5 Drawing Figures

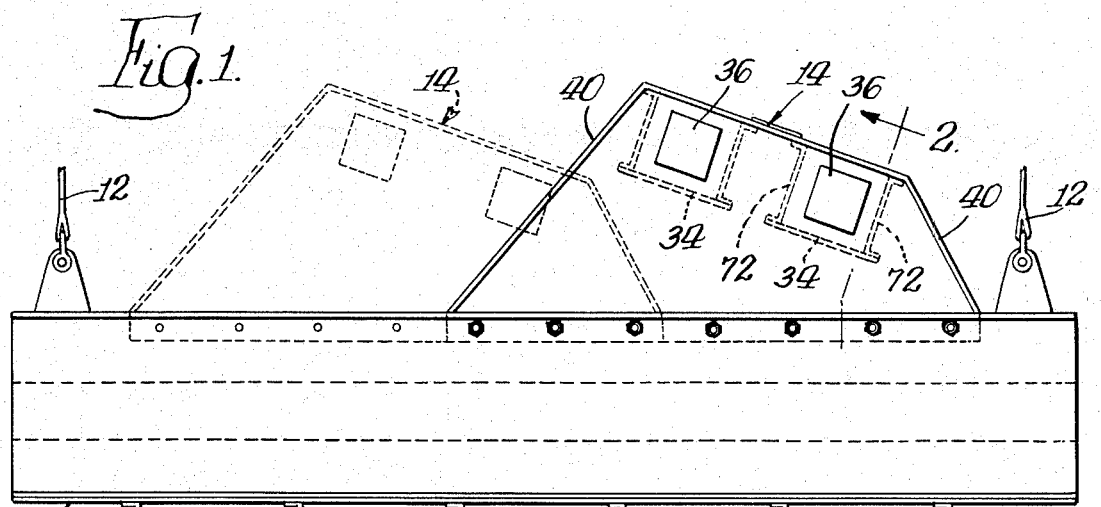
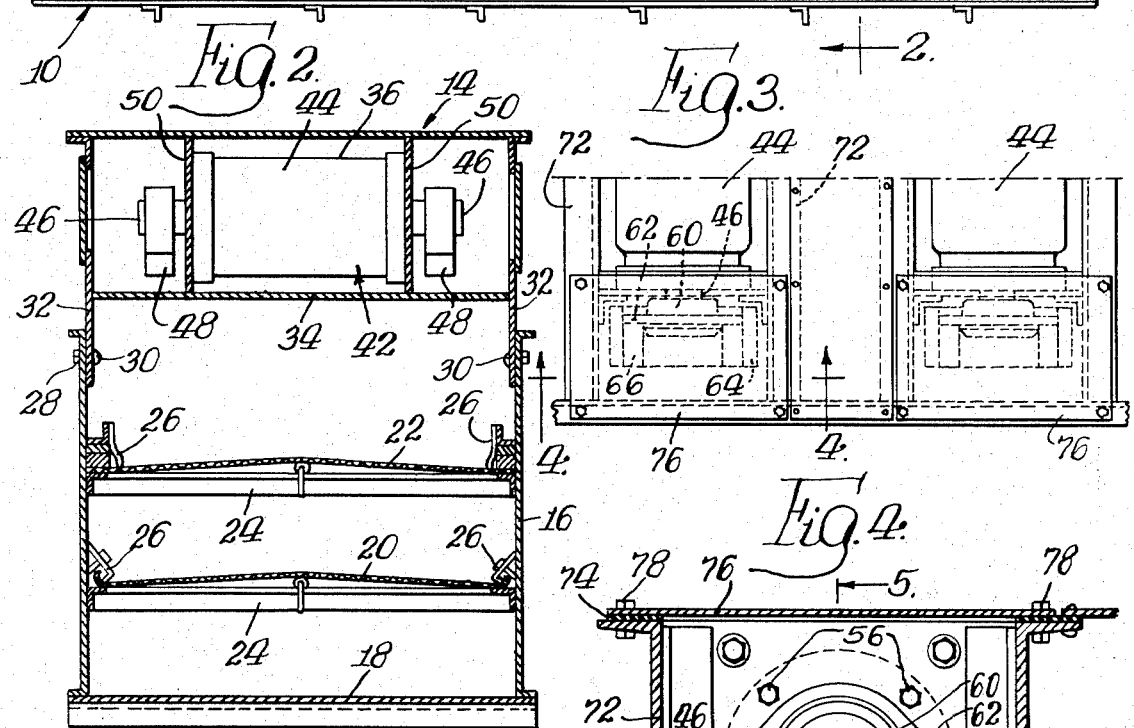
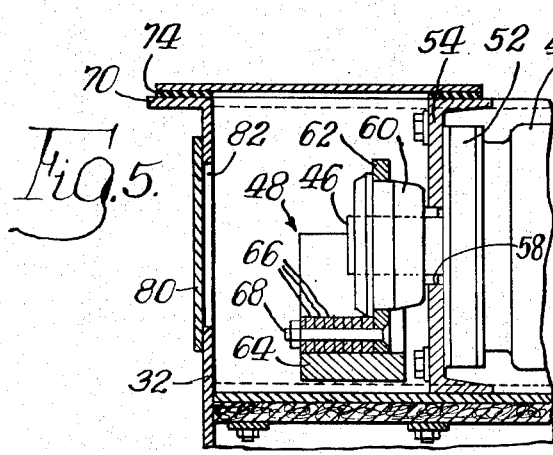
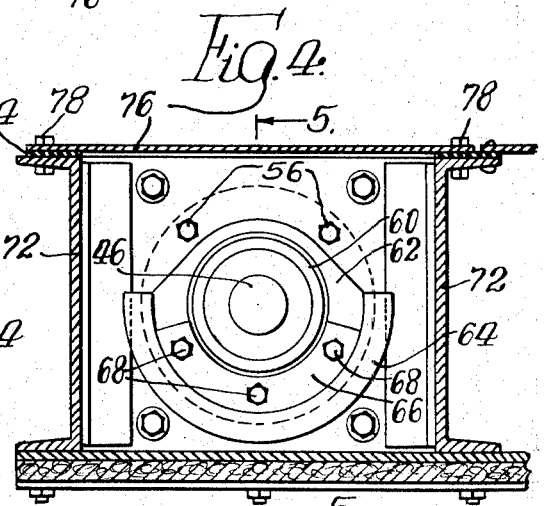
Inventor:—
Albert Musschoot,
By Hofgren, Wegner, Allen,
Stellman & McCord Att'ys.

SEALED DRIVE FOR VIBRATORY MATERIAL HANDLING DEVICE

BACKGROUND OF THE INVENTION

This invention relates to material handling apparatus of the vibratory type and more particularly, to material handlers having vibrating mechanisms which are subject to deterioration due to foreign or particulate material in their operating environment.

Many uses of vibratory material handling apparatus, such as in conveying applications or in classifying applications, take place in environments wherein the mechanism employed for vibrating the surface is subjected to substantial deteriorating influences in the form of foreign or particulate material in the operating environment. Typical of such operations are foundry shakeout systems wherein sand or other abrasive materials are plentiful. If the vibrating mechanism is not adequately protected from such materials, substantial deterioration of the same may result. For example, under extreme conditions, unprotected drives for vibratory mechanisms may be worn out in as little as one day of operation by reason of the highly abrasive operating atmosphere. Obviously, maintenance costs in such operations are extremely high and substantial down time may also be attendant, thereby rendering an entire operation of lesser efficiency than would be desirable.

SUMMARY OF THE INVENTION

It is the principal object of the invention to provide a new and improved vibratory device including a vibrating surface which may be used for conveying and/or classifying or a like operation and wherein a mechanical vibrating device for the same is protected against deterioration due to the presence of abrasives in the operating environment.

The exemplary embodiment of the invention achieves the foregoing object by means of a vibratory surface having a fully protected vibrating mechanism associated therewith for vibrating the same. The vibratory mechanism includes a motor having a sealed casing with a rotary output shaft extending from both ends thereof. Spaced from the casing, and at both ends of the shaft, there are mounted eccentric weights for imparting vibration to the vibrating surface when the motor is energized. Interposed between the weights and the casing and in abutment with the casing at each end of the shaft is a beam-like member having an aperture through which the shaft end passes. Secured to the beam-like member, which defines one wall of a closed housing, are other elements completely enclosing the weight so as to protect the same from abrasives in the atmosphere. Preferably, the motor is of a type having planar casing ends which snugly abut the beam-like member to effect a seal therebetween against such abrasives so that both the motor and the rotating weight associated therewith are fully protected from abrasives in the operating environment.

Other objects and advantages will become apparent from the following specification taken in conjunction with the accompanying drawings.

DESCRIPTION OF THE DRAWINGS

FIG. 1 is a side elevation of a vibratory material handling apparatus made according to the invention;

FIG. 2 is a sectional view taken approximately along the line 2—2 of FIG. 1;

FIG. 3 is a plan view of a portion of the vibratory mechanism;

FIG. 4 is a vertical section taken approximately along the line 4—4 of FIG. 3; and FIG. 5 is an enlarged sectional view of one end of the vibratory mechanism.

DESCRIPTION OF THE PREFERRED EMBODIMENT

An exemplary embodiment of a vibrating device made according to the invention is illustrated in the drawings and is seen to include a material handling device, generally designated 10, for receiving particulate material for conveying and/or vibrating the same. The device 10 is mounted for vibration in a suspended manner by means of cables 12 and secured to its upper surface is a vibratory mechanism, generally designated 14. As illustrated in FIG. 1, the vibratory mechanism 14 can be secured to the device 10 at any of a plurality of locations for the purpose of altering the direction and magnitude of vibration applied to the surface to provide for conveying, classifying or both. The manner by which such is accomplished is more fully described in my copending, commonly assigned application Ser. No. 160,679, entitled "Vibratory Material Handling Device With Variable Force Application," filed July 8, 1971.

With reference to FIG. 2, the device 10 is seen to include an upwardly open trough 16 having an imperforate bottom 18 and a pair of intermediate, particle classifying surfaces in the form of screens 20 and 22. Cross members 24 and clamping devices 26 forming no part of the instant invention mount the classifying surfaces 20 and 22 in the relation indicated.

The vibrating mechanism 14 is secured to the upper ends of the trough 16 by means of nuts 28 and bolts 30 received in aligned apertures in the upper ends of the trough 16 and the lower sides of the vibratory mechanism 14.

More particularly, the vibrating mechanism 14 includes side walls 32 and, a pair of bottom walls 34 elevated above the lowermost extent of the side walls 32. Each of the bottom walls 34 form part of a protective housing for two different vibratory systems 36. Since each system 36 is identical one to the other, only one will be described.

The vibrating mechanism 14 includes a pair of side plates 40, as seen in FIG. 1. Referring now to FIG. 2, just above a respective one of the bottom plates 34 is a motor, generally designated 42, having a sealing casing 44 of conventional construction and a pair of outwardly extending rotary output shaft ends 46. Each of the ends 46 eccentrically mounts a weighted member 48. Interposed between each weighted member 48 and the casing 44 of the motor, is a vertical wall 50.

Turning now to FIGS. 3, 4 and 5, the foregoing construction will be described in detail. The casing 44 includes at each end a planar end flange 52 held in snug abutment with a channel beam 54 defining the wall 50 by means of bolts 56 to effectuate a seal therebetween. The channel beam 54 includes an aperture 58 through which the shaft end 46 extends. On that portion of the shaft end 46 to the left of the channel beam 54 as viewed in FIG. 5, there is secured thereto a hub 60 which in turn eccentrically mounts the weighted member 48. As best seen in FIG. 5, the weighted member 48 includes a crank arm 62 terminating in an arcuate flange 64. Weight segments 66 may be received regularly inwardly of the flange 64 and secured in place by threaded elements 68 impaling the same and threadedly received in the crank arm 62. The total vibratory moment imparted to the vibratory surface 10 may be controlled by regulating the number of weight segments 66 secured to the crank arm 62.

The side wall 32 includes an outwardly extending flange 70 at its upper end which is in approximately the same horizontal plane as the upper arm of the channel beam 54. In addition, a pair of channel-like side walls 72 (FIGS. 1 and 4) are interposed between the bottom wall 34 and the upper extremity of the unit and a rubber gasket member 74 on the closed planar surface thus defined. A sealing plate 76 is secured thereto by any suitable means such as the bolts 78 illustrated thus defining five sides of a housing for the weighted member 48. The sixth wall is, of course, defined by the bottom wall 34 which may be a composite such as illustrated in FIG. 4. Finally, side wall access plate 80 covering openings 82 may be employed if desired.

As a result of the foregoing structure, it will be appreciated that all moving elements of the vibratory mechanism 14 are totally enclosed either within the motor casing 44 or the housing defined by the bottom plate 34, the upper portion of the side wall 32, the top plate 76, the channel beam 54 and the side channel 72. And the abutting relation between the channel beam 54 and the motor casing 44 eliminates any path of entry for abrasive material into the mechanism In the event maintenance is required, all that is necessary is to remove the top plate 76 by removing the bolts 78 for easy access, or in the alternative the plates 80 may be removed to achieve access.

I claim:

1. A vibratory handling apparatus comprising: means defining a material handling surface adapted to perform work on material when vibrated; and means secured to said surface for vibrating the same, said vibrating means defining a box-like frame including a pair of spaced, generally parallel plate-like frame members, means for securing said plate-like frame members to said surface, a motor having a sealed casing with rotary output shafts extending from both ends thereof, said motor casing having opposed, generally planar ends sandwiched between said plates and in abutment therewith, said plates including aligned apertures through which said output shafts pass, a pair of weights, each eccentrically secured to a corresponding one of said output shafts, the ends of said casing being in substantial sealing engagement with corresponding ones of said plates, and means including said plates defining a closed housing for each of said weights, said housings being of sufficient size to accommodate the rotation of the respective weight therein by said motor, at least a portion of said frame being open and exposing said motor casing.

* * * * *